US012798893B2

(12) United States Patent
Frenken et al.

(10) Patent No.: US 12,798,893 B2
(45) Date of Patent: Nov. 17, 2026

(54) SERVO-DRIVEN SINGLING EQUIPMENT

(71) Applicant: GEA Food Solutions Weert B.V., RV Weert (NL)

(72) Inventors: Paulus Henricus Thomas Frenken, NP Weert (NL); Davy Segers, VP Nederweert (NL)

(73) Assignee: GEA Food Solutions Weert B.V., RV Weert (NL)

(*) Notice: Subject to any disclaimer, the term of this patent is extended or adjusted under 35 U.S.C. 154(b) by 326 days.

(21) Appl. No.: 18/271,489

(22) PCT Filed: Jan. 10, 2022

(86) PCT No.: PCT/EP2022/050320
§ 371 (c)(1),
(2) Date: Jul. 10, 2023

(87) PCT Pub. No.: WO2022/152646
PCT Pub. Date: Jul. 21, 2022

(65) Prior Publication Data

US 2024/0067460 A1 Feb. 29, 2024

(30) Foreign Application Priority Data

Jan. 12, 2021 (EP) .................................... 21151091

(51) Int. Cl.
*B65G 47/14* (2006.01)
*B65B 25/00* (2006.01)
(Continued)

(52) U.S. Cl.
CPC ........ *B65G 47/1457* (2013.01); *B65B 25/006* (2013.01); *B65B 35/08* (2013.01);
(Continued)

(58) Field of Classification Search
None
See application file for complete search history.

(56) References Cited

U.S. PATENT DOCUMENTS 5,055,754 A * 10/1991 Kishi ................ G05B 19/4062 700/193
7,287,361 B2 * 10/2007 Asma ..................... B65B 51/14 53/594
(Continued)

FOREIGN PATENT DOCUMENTS

CN 102470992 A 5/2012
CN 105416676 A 3/2016
(Continued)

OTHER PUBLICATIONS

International Search Report and Written Opinion dated Jun. 30, 2022, for International Application PCT/EP2022/050320.
(Continued)

*Primary Examiner* — William R Harp
(74) *Attorney, Agent, or Firm* — The Dobrusin Law Firm, P.C.

(57) ABSTRACT

Singling equipment for an apparatus for packaging lollipops, each lollipop having a head and a stick, the singling equipment includes: a horizontally rotating sorting disc with a plurality of pockets, each of the pockets accommodating the head of the lollipop; a vertically rotating first transfer wheel with a plurality of indentations for the stick of the lollipop; and a vertically rotating second transfer wheel with a plurality of holding means, each of the holding means gripping the stick of the lollipop, the horizontally rotating sorting disc and the vertically rotating first transfer wheel are each driven by a servomotor, whose speed of rotation and/or torque is controlled independently.

17 Claims, 2 Drawing Sheets

(51) Int. Cl.

| | |
|---|---|
| ***B65B 35/08*** | (2006.01) |
| ***B65B 35/26*** | (2006.01) |
| ***B65B 35/56*** | (2006.01) |
| ***B65B 57/14*** | (2006.01) |
| ***B65G 43/10*** | (2006.01) |

(52) U.S. Cl.

CPC .............. *B65B 35/26* (2013.01); *B65B 35/56* (2013.01); *B65B 57/14* (2013.01); *B65G 43/10* (2013.01); *B65G 2201/0202* (2013.01)

(56) References Cited

U.S. PATENT DOCUMENTS

| | | | | |
|---|---|---|---|---|
| 8,020,690 | B2 * | 9/2011 | Asma | A23G 3/125 198/470.1 |
| 8,668,074 | B2 | 3/2014 | Davidson | |
| 9,615,711 | B2 * | 4/2017 | Stein | A47L 9/2857 |
| 10,691,101 | B2 * | 6/2020 | Langwieser | G05B 19/4062 |

FOREIGN PATENT DOCUMENTS

| | | | |
|---|---|---|---|
| CN | 107697569 | A | 2/2018 |
| CN | 211696442 | U | 10/2020 |
| EP | 1283183 | A1 | 2/2003 |
| EP | 1357063 | B1 | 3/2005 |
| EP | 1939092 | A2 | 7/2008 |
| EP | 1847179 | B1 | 5/2009 |
| EP | 2108589 | A1 | 10/2009 |
| JP | S642149 | U | 1/1989 |
| JP | 2017-105564 | A | 6/2017 |
| JP | 2018-135179 | A | 8/2018 |
| TW | I686343 | B | 3/2020 |

OTHER PUBLICATIONS

International Preliminary Report on Patentability dated Apr. 6, 2023, for International Application PCT/EP2022/050320.

Chinese First Office Action, issued on Apr. 11, 2025 for Chinese Patent Application No. 2022800098642.

* cited by examiner

SERVO-DRIVEN SINGLING EQUIPMENT

CROSS-REFERENCE TO RELATED APPLICATIONS

This application is a US National Stage of PCT/EP2022/050320 filed Jan. 10, 2022, which claims priority to EP21151091.2 filed Jan. 12, 2021.

FIELD

The invention relates to a singling equipment for a device for packaging lollipops each lollipop having a head and a stick, the equipment comprising a horizontally rotating singling disc with a plurality of pockets each pocket accommodating the head of the lollipop and a vertically rotating first transfer wheel with a plurality of indentations for the stick of the lollipop and a vertically rotating second transfer wheel with a plurality of holding means each holding means gripping the stick of a lollipop. The present invention further relates to a lollipop wrapping apparatus and a method to operate a singling machine or a method to change the sorting disk,

BACKGROUND

It is known to package articles like lollipops in a film/foil sheet, in which case the articles must be separated before they are packaged. This separation can be carried out with a machine as taught in the patents EP 1 357 063 B1 or EP 1 847 179 B1. However, these machines are not suitable for the separation of lollipops and/or their capacity is relatively low and/or they are difficult to operate.

SUMMARY

It is an object of the invention to provide the singling equipment for lollipops, a lollipop processing apparatus, a method to operate the singling equipment and/or a method to change the sorting disk of a singling equipment which is able to achieve a high singling rate and/or which is easy to operate.

The problem is solved with a singling equipment for an apparatus for packaging lollipops each lollipop having a head and a stick, the equipment comprising a horizontally rotating singling disc with a plurality of pockets each pocket accommodating the head of the lollipop and a vertically rotating first transfer wheel with a plurality of indentations for the stick of the lollipop and a vertically rotating second transfer wheel with a plurality of holding means each holding means gripping the stick of a lollipop, wherein the sorting disc and the first transfer wheel are each driven by a servomotor, whose speed of rotation and/or torque is controlled independently.

The disclosure regarding this subject matter of the present invention, also applies to other subject matters disclosed in this application and vice versa. Features disclosed regarding this subject matter can be incorporated into other subject matters and vice versa.

The present invention relates to a singling equipment to individualize lollipops for further processing, particularly wrapping. Each lollipop has a head, made from an edible material and a stick. The singling equipment comprises a sorting disk with a plurality of individual pockets at its outer circumference. The pockets are preferably provided equidistantly around a circular ring. The sorting disk rotates around a vertical axis, thereby orienting the randomly incoming lollipops into the pockets, preferably such, that the stick of the lollipop extends outside of the outer circumference of the sorting disc. Each pocket has preferably a circular cross section.

At the inner diameter of the circular ring of the sorting disk accommodating the pockets, preferably, a rotating distribution disc is provided, which transports the lollipops towards the pockets of the sorting disc. The sorting disc and the distribution disc preferably counter-rotate around one common axis. The speed of rotation of the distribution disc and the sorting disc may be equal or different, wherein the ratio of the two speeds of rotation preferably remains constant. The distribution disc and the sorting preferably have one single motor.

Furthermore, the singling equipment comprises a first and a second transfer wheel. The first transfer wheel has a multitude of indentations at its outer circumference, which each can take up the stick of a lollipop. The first transfer wheel rotates around a horizontal axis for pushing and/or lifting the lollipop sticks and supply them to the second transfer wheel. The second transfer wheel also rotates around a horizontal axis, but in the opposite direction than the first transfer wheel and has a multitude of holding means, preferably grippers, more preferably gripper-arm-pairs, at its circumference, which each releasably grip the stick of a lollipop. The second transfer wheel transports the individualized lollipops to a further processing unit, for example a wrapping unit. The skilled person understands that "the second transfer wheel" can also be an endless transportation means, for example a chain, that rotates around two or more wheels, for example sprockets. At this transportation means holding means are provided. However, a wheel is preferred as the "second transfer wheel".

The sorting disk and/or the first transfer wheel are preferably exchangeable parts and more preferably tailormade for the handling of a specific lollipop, particularly for a specific lollipop head size, more particularly for spherical lollipop heads with a specific head diameter. Particularly, the number of pockets in the sorting disk and/or their size/shape differ from sorting disk to sorting disk. The number of indentations in the first transfer wheel and/or their size/shape may vary and are preferably adapted to a specific application. Preferably, a specific sorting disc and a set of specific first transfer wheels is a matching pair. Preferably one first transfer wheel is suitable for two or more different sorting discs.

Preferably, the sorting disc as well as the first transfer wheel each comprise an identification, for example an RFID, which is read out by a sensor which may be part of the singling equipment or a further processing apparatus. Preferably, the machine can only be started, in case the identifications of both match for the desired singling task. In case the two identifications match, the singling machine is preferably configurated automatically; e.g. the parameters needed to operate the singling equipment and/or the further processing apparatus are retrieved automatically, particularly once the operator has specified the lollipop to be singled and/or the output per time-unit.

According to the present invention, the sorting disc and the first transfer wheel are each driven by a servomotor.

A servomotor according to the present invention is a rotary actuator that allows precise control of angular position and/or velocity and/or acceleration and/or torque provided of the output-shaft of the motor and/or the part connected to it; e.g. the sorting disk and/or the first transfer wheel. A servomotor comprises of a suitable motor coupled with a sensor for position feedback. It also requires a controller.

A servomotor is preferably a closed-loop mechanism that can use position feedback from the output shaft and/or the sorting disk and/or the first transfer wheel to control its motion and/or final position and/or the provided torque. The input to its control can be a signal representing the position and/or the speed and/or the acceleration and/or the torque commanded for the output shaft the sorting disk and/or the first transfer wheel.

The motor is preferably paired with an encoder to provide position- and/or speed- and/or acceleration-feedback. The motor may also be paired with a torque encoder to provide feedback about the torque provided for example by the shaft of the motor. In the simplest case, only the position of the output shaft and/or the sorting disk and/or the first transfer wheel is measured. The measured position is compared to the desired position. If the actual position differs from the required position, a signal is generated which then causes the motor to accelerate or decelerate as needed to bring the output shaft and/or the sorting disk and/or the first transfer wheel to the appropriate position and/or rotary velocity.

Preferably, the controller of the servo comprises an amplifier, wherein the proportional amplification factor for the first transfer wheel is made adjustable. According to this preferred embodiment, the first transfer wheel can be given a rotational "spring effect". This allows, for example, to transfer lollipops from the sorting disc to the first transfer wheel and then to the second transfer wheel which have e.g. a bended stick. The first transfer wheel will adapt the take over of the lollipop from the sorting disc by adapting its movement to the needs of the misaligned stick of the lollipop. Particularly, the speed of rotation of the first transfer wheel and/or the singling disc is adapted. Prior to the transfer of the lollipop to the second transfer wheel the servo motor corrects the position of the first transfer wheel and thus is back in the correct timing of the machine, particularly the timing of the second transfer wheel.

The second transfer wheel is preferably driven by motor means which are separate from the servo motors of the sorting disk and the first transfer wheel. Theses motor means are preferably driven independently from the first transfer wheel and/or the singling disc.

According to the present invention, the singling equipment comprises one servomotor for the sorting wheel and one servomotor for the first transfer wheel. These two servomotors can be controlled independently from each other and independently from all other drives of the singling equipment and/or a connected machine.

The problem is also solved by another inventive or preferred embodiment of the present invention, wherein the sorting disk comprises a plurality of openings and wherein the number of openings is identical to the number of pockets.

The disclosure regarding this subject matter of the present invention, also applies to other subject matters disclosed in this application and vice versa. Features disclosed regarding this subject matter can be incorporated into other subject matters and vice versa.

According to this inventive or preferred embodiment, additionally to the pockets, which each accommodate the head of a lollipop, the singling disc comprises openings, wherein the number of openings is identical to the number of pockets. The openings can be utilized to position the pockets of the singling disc relative to first transfer wheel and vice versa. Preferably, a sensor determines the position of an opening and compares it with a set-value.

This signal is used to control the servo motor of the singling disc and/or the first transfer wheel. The openings are preferably provided along a circular ring, preferably inside of the circular ring which accommodates the pockets. Preferably, the center of each pocket is radially aligned with the center of one opening. Preferably, the openings have a circular cross section. The openings are preferably equidistantly distributed around the circular ring of the sorting disc.

The openings, preferably their number, is preferably utilized as the identification for the individual sorting disc.

Preferably, the singling equipment comprises a sensor which locates the tangential position of an opening and/or the tangential position of the corresponding pocket. This signal allows to position singling disc relative to the first transfer wheel and vice versa.

The signal of the sensor may also be utilized to count the number of openings on one sorting disc. This information can be utilized as identification for the individual sorting disc.

Preferably, the singling equipment comprises controlling means which control the speed of rotation of the first transfer wheel and/or the singling disc, more preferably independently from each other.

Another embodiment of the present invention is a lollipop processing apparatus, particularly a lollipop wrapping apparatus comprising the inventive or preferred singling equipment.

The disclosure regarding this subject matter of the present invention, also applies to other subject matters disclosed in this application and vice versa. Features disclosed regarding this subject matter can be incorporated into other subject matters and vice versa.

According to this embodiment, the inventive or preferred singling equipment is part of a lollipop processing apparatus, preferably a lollipop wrapping apparatus, which is located downstream from the second transfer wheel.

Another embodiment of the present invention is a method to operate the inventive or preferred singling equipment and/or the inventive lollipop processing apparatus, wherein the torque provided by the servomotor of the sorting disk or of the first transfer wheel is monitored permanently and/or a position deviation of the sorting disc and the first transfer wheel is monitored permanently.

The disclosure regarding this subject matter of the present invention, also applies to other subject matters disclosed in this application and vice versa. Features disclosed regarding this subject matter can be incorporated into other subject matters and vice versa.

"Permanently" in the sense of the present invention is preferably every 0.01-100 milliseconds, more preferably every 0.1-10 milliseconds, even more preferably 0.2-0.6 milliseconds.

According to this preferred embodiment of the present invention, the torque provided by the servo motor that drives the sorting disk and the torque provided by the servo motor that drives the first transfer wheel are monitored permanently. Preferably, a window of acceptable torque values is set within which deviations of the position of the sorting disc and/or first transfer wheel can automatically be corrected. The window can be ±deviation from a set value or an average value that is needed to rotate the singling disc and/or the first transfer wheel. There are preferably different windows for the sorting disc and for the first transfer wheel. Each window can be a stored parameter, that is automatically downloaded in case the control system of the singing equipment recognizes a specific sorting disc or a specific first transfer wheel. Each window can also be part of a recipe, in case a different lollipop is produced.

In case the required torque to operate the singling disc and/or the first transfer wheel is within this window, the controller of the singling equipment will automatically compensate position-deviations of the singling disc and/or the first transfer wheel. In case the needed torque of at least one servo motor of the singling disc or the first transfer wheel is outside of this window, the equipment preferably stops automatically. This avoids server damage of the singling equipment.

The above said analogously applies to the position of the singling disc and/or the first transfer wheel. As long as the deviation of the actual rotational position of the sorting disc and/or the first transfer wheel is within a window, the position is adjusted automatically. However, in case the deviation of the position of the sorting disc or the first transfer wheel is outside of the window, the equipment is preferably stopped automatically.

After an automatic stop, a worker or an automated system can inspect the singling equipment, solve the problem if needed and then restart it. An automatic stop is for example an indication for the need of cleaning and/or the crush of a lollipop.

The problem is also solved with another preferred or inventive subject matter of the present invention, wherein, even during a constant output of singled or wrapped lollipops or during a constant speed of rotation of the second transfer wheel, the speed of rotation of the first transfer wheel is not constant.

The disclosure regarding this subject matter of the present invention, also applies to other subject matters disclosed in this application and vice versa. Features disclosed regarding this subject matter can be incorporated into other subject matters and vice versa.

According to this inventive or preferred method of the present invention, the speed of rotation of the singling disc and or the first transfer wheel is not constant even under steady state conditions of the singling equipment and/or the lollipop processing apparatus; e.g. constant output of singled or wrapped lollipops and/or constant speed of rotation of the second transfer wheel. Preferably, the singling disc and/or the first transfer wheel accelerate and decelerate during its operation. This allows to correct irregularities during the production process, for example a bent lollipop stick.

The acceleration and deceleration allow a “spring-like”-behavior of the singling disc and/or the first transfer wheel, particularly the behavior of a spiral spring. An acceleration is preferably followed by a deceleration and vice versa.

Preferably, the speed of rotation of the first transfer wheel changes during the pick up of the lollipop from the sorting disk until the hand over to the second transfer wheel. Preferably the speed of rotation of the sorting disc and of the first transfer wheel changes during the pick up of the lollipop out of the sorting disc.

Another subject matter of the present invention, which also solves the stated problem is a method to change the sorting disk and/or the first transfer wheel of a singling equipment, wherein the sorting disk and the first transfer wheel each comprise identification means which is read out and wherein a computer system checks whether the sorting disk and the transfer wheel match together and/or for the desired lollipop singling.

The disclosure regarding this subject matter of the present invention, also applies to other subject matters disclosed in this application and vice versa. Features disclosed regarding this subject matter can be incorporated into other subject matters and vice versa.

All sorting discs and/or first transfer wheels that can be installed on the inventive singling equipment preferably have the same outer diameter. Preferably only the number of pockets or the numbers of indentations alter.

According to this subject matter of the present invention, both the sorting disc and the first transfer wheel comprise identification, which allows to individualize the respective part, so that a computer means associated with the singling equipment knows exactly which sorting disc and which first transfer wheel have been connected to the singling equipment. After having received this information, the computer means check whether the installed singling disc and first transfer wheel match and/or match for the desired singling operation, e.g. is suitable for the lollipops to be singled and/or for the desired capacity. Preferably, the singling equipment can be started, in case at least one match, preferably all matches is/are confirmed.

“Identification” according to the present invention means that at least information to individualize the respective part can be extracted from the identification. However, the identification may comprise a storage means which allows to store additional data, for example operation time, maintenances performed, maintenances needs, cleaning cycles and/or cleaning needs. This information can be extracted from the storage means for example by the singling equipment and/or can be regularly updated.

Preferably, the identification means is the number of openings in the sorting disc which are preferably counted by a computer means of the like, preferably while the disk rotates on the singling equipment. Another preferred alternative is an RFID.

The inventions are now explained according to the FIGS. 1-3. These explanations do not limit the scope of protection. The explanations apply to all embodiments of the present invention likewise.

DETAILED DESCRIPTION

Figure 1:
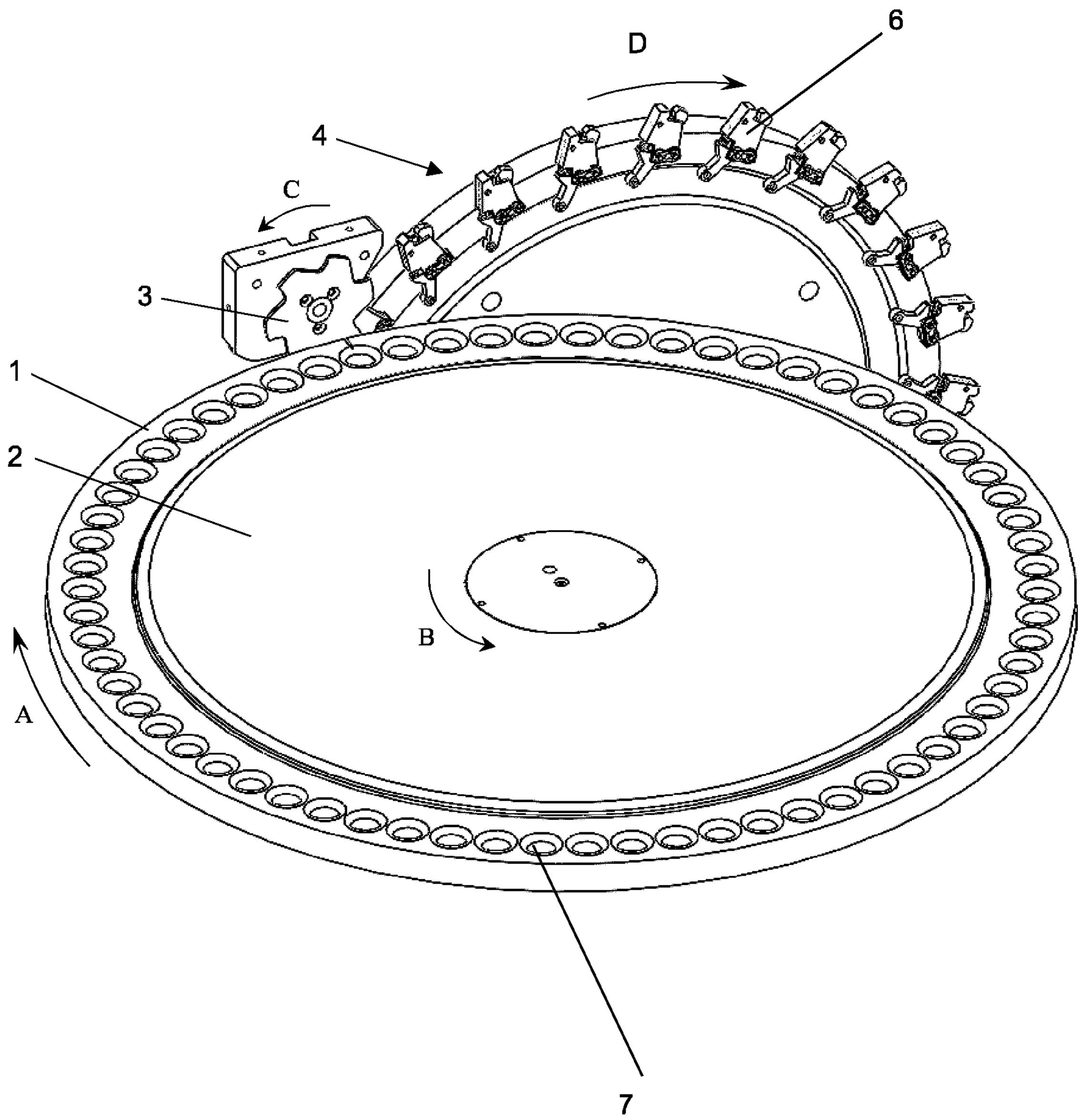
FIG. 1 depicts the inventive singling equipment.
Figure 2:
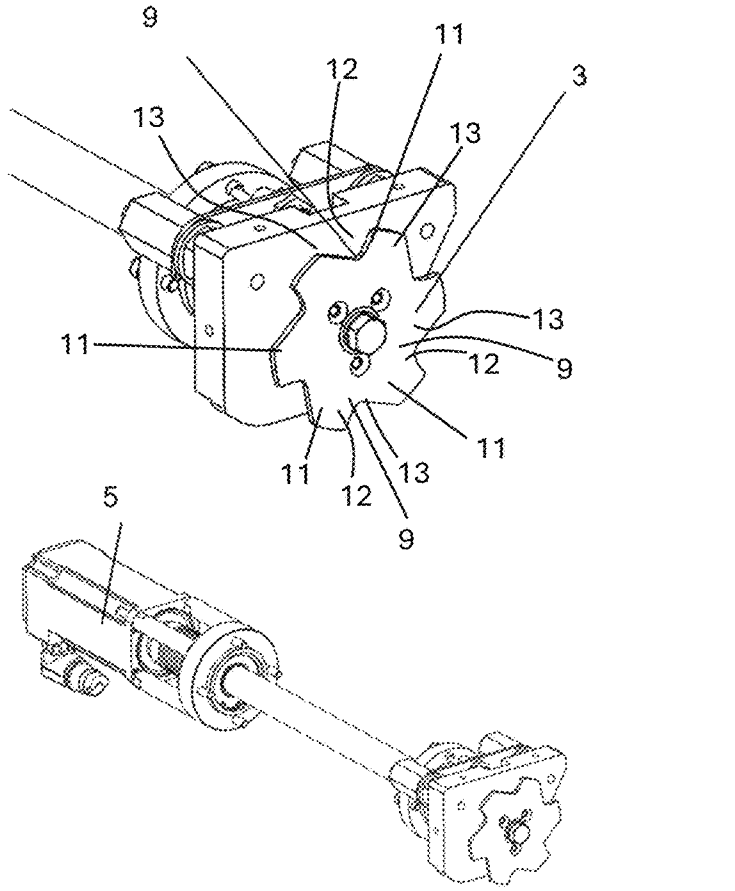
FIG. 2 depicts details of the first transfer wheel.
Figure 3:
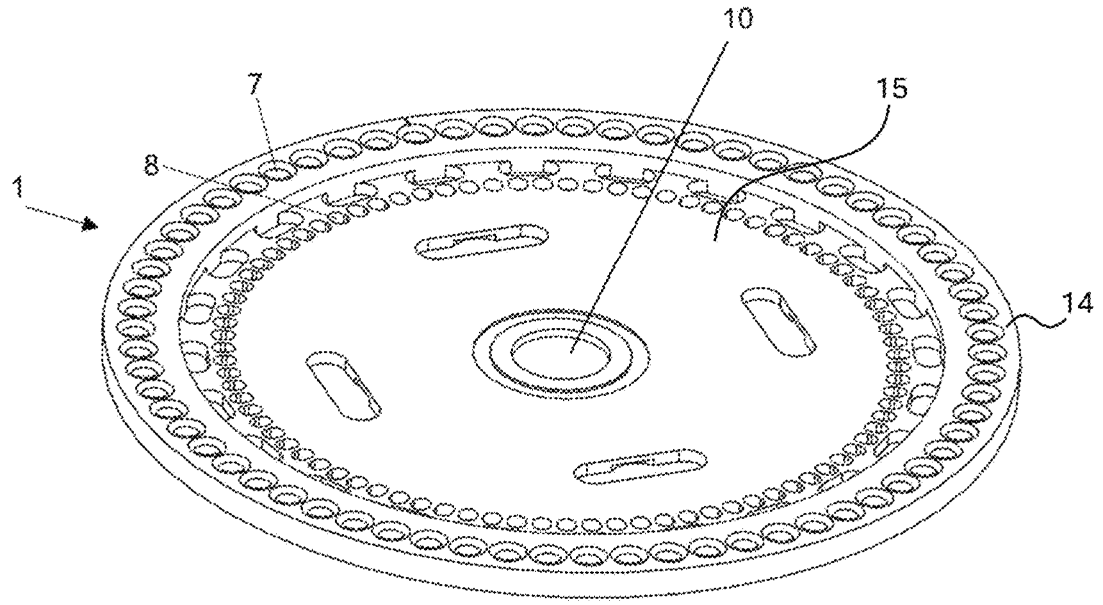
FIG. 3 depicts details of the sorting disc.

The inventive singling equipment according to FIGS. 1-3 is used to process lollipops with a stick and a head. The heat is preferably sphere-shaped, wherein the spheres may have different diameters, depending on the lollipop being produced. The stick is preferably cylindrical, wherein the diameter of the cylinder may change depending on the lollipop being produced. A distribution disc 2 rotates here counter-clockwise around a vertical axis of rotation B as depicted by the arrow. The distribution disc transports the lollipops to its circumference. At the circumference, a sorting disc 1 is provided which rotates in the present case clockwise around the same vertical axis as the distribution disc and as indicated by arrow A. The sorting disc 1 comprises a multitude of equidistantly spaced pockets 7, into which the lollipops are arranged due to the rotation of the distribution- and/or the sorting disc such, that the head of the lollipop is accommodated in the pocket 7 and the stick of the lollipop extends over the circumference of the sorting disc 1. The number of pockets 7 that can be provided on the sorting disc is preferably dependent on the size of the diameter of the lollipop head. The inventive singling equipment can be operated with different sorting disks, with a differing number of pockets 7, while the outer diameter of the sorting disk is preferably always the same. The sorting- and the distribution disc preferably have one common drive, here a servo motor. The lollipops are removed from the sorting disc 1 by a first transfer wheel 3, which rotates around a horizontal axis. The first transfer wheel 3 rotates her counterclockwise around a horizontal axis, as indicated by arrow C. The first transfer wheel 3 has a multitude of equidistantly spaced indentations 9, which lift and/or push the sticks of a lollipop into holding means 6, for example the arms of a gripper 6, which is attached to the second transfer wheel 4. The first transfer wheel 3 comprises a plurality of lobes 11 extending radially around a periphery of the first transfer wheel 3, each of the plurality of lobes 11 being defined by a first wall 12 and a second wall 13, and each of the plurality of indentations 9 being defined at a junction where the first wall 12 of one of the plurality of lobes 11 converges with the second wall 13 of an adjacent one of the plurality of lobes 11. The inventive singling equipment can be operated with different first transfer wheels, with a differing number of indentations, while the outer diameter of the first transfer wheel is preferably always the same. The second transfer wheel 4 has a multitude of equidistantly spaced holding means/grippers 6 at its circumference and rotates here clockwise as indicated by arrow D. At least one arm of a gripper can be moved relative to the other and thereby grip and release the stick of a lollipop. The second transfer wheel preferably rotates preferably at a constant speed. The second transfer wheel hands the lollipops over to a further processing unit, for example a wrapping unit.

Reference is now particularly made to FIG. 3, which depicts details of the sorting disk 1, which has at its outer circumference a multitude of pockets 7, which are arranged around a circular ring. Each pocket 7 preferably has a circular cross section. The sorting disk further comprises a multitude of openings 8, which preferably extend through the entire thickness of the sorting disk and which are arranged preferably equidistantly around a circular ring, which is located within the inner circumference of the circular ring 14 that accommodates the pockets 7. The sorting disc 1 has a recessed portion 15 that is located radially inward of the circular ring 14. The openings 8 preferably have each a circular cross section. The center of the cross section of one opening is preferably radially aligned with the center of the opening of one pocket. The inventive singling equipment may have a sensor (not depicted), which is for example provided below the sorting disk and senses each opening, while the sorting disk rotates. This provides a controller, which is attached to the sensor, information about the tangential position of the respective opening 8 and hence about the tangential position of the corresponding pocket 7. This information is used to position the sorting disk relative to the first transfer wheel and/or vice versa. For illustrative purposes, the distribution disk 2 has been omitted in FIG. 3. The distribution disk 2 is arranged within the recessed portion 15 or the inner circumference of the circular ring 14 that accommodate the pockets 7. The distribution disk 2 covers the openings 8. The distribution disk rotates around the same axis 10 as the sorting disk but in an opposite direction than the sorting disc 1. The sorting disk 1 and/or the first transfer wheel preferably each comprise an identification, that allows computer means to identify the respective part. The identification is preferably the number of openings 8 in the sorting disc.

The motor that drives the first transfer wheel is depicted in FIG. 2. This motor is a servo motor. The sorting disk is also driven by a servo motor.

In case a new production starts or after cleaning of the singling equipment, a sorting disk 1 and in case the transfer wheel has been removed, a first transfer wheel 3 is installed and an identification at least of the sorting disk, but preferably also of the identification of the first transfer wheel is read out by the singling equipment. This information is transferred to a computer means which checks whether the sorting disk and the first transfer wheel match and/or whether the sorting disk and the first transfer wheel match a selected recipe. Preferably, only after at least one match is confirmed, the operation can be started.

To start the inventive singling equipment, a worker chooses a recipe for a lollipop to be singled and further processed, for example wrapped. The necessary sorting disc is then installed and its identification is checked, preferably by rotating the sorting disk and counting the openings 8. Preferably a first transfer wheel is also installed and its identification is checked. At least one, preferably both identifications are then compared, with data from the recipe to check whether the sorting disk and the first transfer wheel match with the requirements from the recipe. Preferably, only then the singling equipment can be started. The recipe preferably includes set operation conditions of the singling equipment, like the speed of rotation of singling disk and/or the first- and/or second transfer wheel and/or the window of allowable deviations of the position of the singling disc and/or the first transfer wheel and or the torque required to position the singling disc and/or the first transfer wheel.

The present invention has the advantage that more pockets can be accommodated in the singling disc. The sorting disk can be operated with a lower rotation speed at the same lollipop output. Due to the automatic stop in case a certain torque is exceeded and/or a certain deviation of the position of the sorting disk and/or the first transfer wheel takes place, damage of the singling equipment and/or downtime of this equipment is avoided.

REFERENCE NUMBERS

1 Sorting disc
2 Distribution disc
3 First transfer wheel
4 Second transfer wheel
5 Servo motor
6 Holding means, gripper
7 Pocket, hole for the lollipop to fall in
8 Opening
9 indentation
10 Center axis
A Direction of rotation of the sorting disc 1
B Direction of rotation of distribution disc 2
C Direction of rotation of the first transfer wheel 3
D Direction of rotation of second transfer wheel 4

The invention claimed is:

1. Singling equipment for an apparatus for packaging lollipops, each lollipop having a head and a stick, the singling equipment comprising:

a horizontally rotating sorting disc with a plurality of pockets, each of the pockets configured for accommodating the head of the lollipop;

a vertically rotating first transfer wheel with a plurality of indentations configured for accommodating the stick of the lollipop; and a vertically rotating second transfer wheel with a plurality of holding means, each of the holding means configured for gripping the stick of the lollipop, wherein the horizontally rotating sorting disc and the vertically rotating first transfer wheel are each driven by a servomotor, whose speed of rotation and/or torque is controlled independently, wherein the horizontally rotating sorting disc comprises i) a circular ring that includes the plurality of pockets, and ii) a recessed portion that is located radially inward of the circular ring, wherein a distribution disc is configured to be received into the recessed portion of the horizontally rotating sorting disc, wherein the horizontally rotating sorting disc comprises a peripheral portion and a plurality of openings, and the recessed portion is located inward of the peripheral portion, wherein the plurality of openings are covered by the distribution disc from above after the distribution disc is received into the recessed portion of the sorting disc.

2. Singling equipment according to claim 1, wherein a center of each of the plurality of pockets is radially aligned with a center of a respective opening of the plurality of openings.

3. Singling equipment according to claim 1, wherein the singling equipment comprises a controlling means which control the speed of rotation of the vertically rotating first transfer wheel and/or the horizontally rotating sorting disc.

4. Method to operate the singling equipment according to claim 1, wherein the method comprises monitoring the torque and/or a position deviation of the horizontally rotating sorting disc and the vertically rotating first transfer wheel.

5. Method according to claim 4, wherein the method comprises adjusting a required torque to maintain the horizontally rotating sorting disc and/or the vertically rotating first transfer wheel in a desired rotational position.

6. Method according to claim 5, wherein the method comprises adjusting the torque within a preset window of torque values.

7. Method according to claim 6, wherein the method comprises stopping the servomotor of the horizontally rotating sorting disc and/or the servomotor of the vertically rotating first transfer wheel when the required torque is outside the preset window of torque values.

8. Method according to claim 7, wherein the sorting disc and the vertically rotating first transfer wheel are checked whether they match together and/or for a desired lollipop singling.

9. Method according to claim 8, wherein in case the sorting disc and the vertically rotating first transfer wheel match, the singling equipment is configured automatically.

10. Method to operate the singling equipment according to claim 1, wherein during a constant output of singled or wrapped lollipops or during a constant speed of rotation of the vertically rotating second transfer wheel, the method comprises not maintaining a constant speed of rotation of the vertically rotating first transfer wheel.

11. Method according to claim 10, wherein the speed of rotation of the vertically rotating first transfer wheel changes during a step of picking up of the lollipop from the horizontally rotating sorting disc until a hand over to the vertically rotating second transfer wheel.

12. Method to change the horizontally rotating sorting disc and/or the vertically rotating first transfer wheel of the singling equipment according to claim 1, wherein the method comprises reading out an identification means of the horizontally rotating sorting disc and the vertically rotating first transfer wheel, and checking with a computer system whether the horizontally rotating sorting disc and the vertically rotating first transfer wheel match together and/or for the desired lollipop singling.

13. Method according to claim 12, wherein the identification means are openings in the horizontally rotating sorting disc.

14. Method according to claim 13, wherein the openings are counted and compared with a set-value in order to determine whether a correct horizontally rotating sorting disc has been installed.

15. Singling equipment according to claim 1, wherein the vertically rotating first transfer wheel comprises a plurality of lobes extending radially around a periphery of the vertically rotating first transfer wheel, each of the plurality of lobes being defined by a first wall and a second wall, and each of the plurality of indentations being defined where the first wall of one of the plurality of lobes meets with the second wall of an adjacent one of the plurality of lobes.

16. Singling equipment according to claim 1, wherein the vertically rotating first transfer wheel comprises a plurality of lobes extending radially around a periphery of the vertically rotating first transfer wheel, each of the plurality of lobes being defined by a first wall and a second wall, and each of the plurality of indentations being defined where the first wall of one of the plurality of lobes meets with the second wall of an adjacent one of the plurality of lobes.

17. Singling equipment according to claim 1, wherein the horizontally rotating sorting disc comprises an identification means for a computer system to check whether the horizontally rotating sorting disc and the vertically rotating first transfer wheel match together and/or for the desired lollipop singling, and the plurality of openings are covered by the distribution disc from above after the distribution disc is received into the recessed portion of the sorting disc.

* * * * *